US012107316B2

(12) United States Patent
Zimmerman et al.

(10) Patent No.: US 12,107,316 B2
(45) Date of Patent: Oct. 1, 2024

(54) SATELLITE ANTENNA ANTI-ICING SYSTEM AND METHOD

(71) Applicant: Viasat, Inc., Carlsbad, CA (US)

(72) Inventors: Kurt A. Zimmerman, Carlsbad, CA (US); Jack C. Newkirk, Carlsbad, CA (US)

(73) Assignee: VIASAT, INC., Carlsbad, CA (US)

(*) Notice: Subject to any disclaimer, the term of this patent is extended or adjusted under 35 U.S.C. 154(b) by 0 days.

(21) Appl. No.: 18/287,865

(22) PCT Filed: Apr. 20, 2022

(86) PCT No.: PCT/US2022/025565
§ 371 (c)(1),
(2) Date: Oct. 20, 2023

(87) PCT Pub. No.: WO2022/226081
PCT Pub. Date: Oct. 27, 2022

(65) Prior Publication Data

US 2024/0097307 A1 Mar. 21, 2024

Related U.S. Application Data

(60) Provisional application No. 63/177,356, filed on Apr. 20, 2021.

(51) Int. Cl.
*H01Q 1/02* (2006.01)
*H01Q 1/42* (2006.01)
*H01Q 19/19* (2006.01)

(52) U.S. Cl.
CPC ................. *H01Q 1/02* (2013.01); *H01Q 1/42* (2013.01); *H01Q 19/193* (2013.01)

(58) Field of Classification Search
CPC ........... H01Q 1/02; H01Q 1/42; H01Q 19/193
See application file for complete search history.

(56) References Cited

U.S. PATENT DOCUMENTS 3,173,141 A 3/1965 Bowman
5,010,350 A 4/1991 Lipkin et al.
(Continued)

FOREIGN PATENT DOCUMENTS

CN 113067117 7/2021
DE 3814276 11/1989
(Continued)

OTHER PUBLICATIONS

Notification of Transmittal of the International Search Report and Written Opinion dated Jun. 28, 2022 in PCT International Patent Application No. PCT/US2022/025565.
(Continued)

*Primary Examiner* — Awat M Salih
(74) *Attorney, Agent, or Firm* — Snell & Wilmer L.L.P.

(57) ABSTRACT

An antenna may have features to ameliorate ice accumulation thereon. For instance, the antenna may include a feed structure between a reflector and a radome. The radome may cover at least a portion of the antenna and/or components of the antenna. A heating element may be located at various locations on the feed structure of the antenna. The heating element may heat the radome or other aspects of the antenna. The heating element may heat the radome or other aspects by infrared radiation, and/or via circulating warmed air. A fan may be provided to promote circulation of warmed air. The heat ameliorates ice accumulation the antenna so that ice accumulation does not diminish the electromagnetic performance of the antenna.

18 Claims, 12 Drawing Sheets

(56) References Cited

U.S. PATENT DOCUMENTS

| | | | | |
|---|---|---|---|---|
| 5,353,037 | A | 10/1994 | Jones | |
| 5,729,238 | A | 3/1998 | Walton, Jr. | |
| 5,844,528 | A | 12/1998 | Jones | |
| 6,005,526 | A | 12/1999 | Jones | |
| 6,445,349 | B1 | 9/2002 | Jones | |
| 7,397,442 | B2 | 7/2008 | Hawes | |
| 8,279,604 | B2 | 10/2012 | Jones et al. | |
| 8,422,232 | B2 | 4/2013 | Kwak et al. | |
| 2012/0098723 | A1 * | 4/2012 | Yamamoto | H01Q 17/00 343/781 R |
| 2020/0212573 | A1 * | 7/2020 | Syed | H01Q 19/132 |
| 2021/0313665 | A1 | 10/2021 | Hoganson | |

FOREIGN PATENT DOCUMENTS

| | | |
|---|---|---|
| DE | 19542772 | 5/1997 |
| DE | 20005721 | 6/2000 |
| EP | 2045870 | 4/2009 |
| JP | S58 151702 | 9/1983 |
| JP | 61-129903 | 6/1986 |
| JP | H02 34004 | 2/1990 |
| JP | H05 121928 | 5/1993 |
| JP | H09 326618 | 12/1997 |
| JP | 2007110362 | 4/2007 |
| WO | 2008118681 | 3/2008 |

OTHER PUBLICATIONS

Written Opinion dated Apr. 20, 2023 in PCT International Patent Application No. PCT/US2022/025565.

International Preliminary Report on Patentability dated Jul. 4, 2023 in PCT International Patent Application No. PCT/US2022/025565.

* cited by examiner

SATELLITE ANTENNA ANTI-ICING SYSTEM AND METHOD

RELATED APPLICATIONS

This Application is a U.S. national stage entry under 35 U.S.C. § 371 of International Application No. PCT/US2022/025565 filed Apr. 20, 2022, entitled "SATELLITE ANTENNA ANTI-ICING SYSTEM AND METHOD", which claims priority to, and the benefit of, U.S. Provisional Application Ser. No. 63/177,356 filed on Apr. 20, 2021, entitled, "SATELLITE ANTENNA ANTI-ICING SYSTEM AND METHOD". The foregoing application is hereby incorporated by reference in its entirety (except for any subject matter disclaimers or disavowals, and except to the extent of any conflict with the disclosure of the present application, in which case the disclosure of the present application shall control).

TECHNICAL FIELD

This disclosure relates generally to an antenna, and more specifically to an antenna with features for ameliorating ice accumulation on the antenna.

BACKGROUND

Antennas, such as satellite dish antennas, communicate signals satellites and other devices. These antennas include a reflector that collimates or focuses an associated radio signal. These antennas typically include a feed horn spaced away from the reflector to send and/or receive the associated radio signal. However, inclement conditions, such as cold or wet weather, may contribute to accumulation of ice on an aspect of the antenna. In various instances, a radome or other cover at least partially encloses the reflector. Ice may also accumulate on the radome or other cover, impeding transmission and reception of the associated radio signal. Thus, there remains a need to ameliorate ice accumulation on antennas to improve the transmission and reception of radio signals.

SUMMARY

One example of an antenna includes a transmission line, a feed horn, a reflector, a radome, a feed structure, and a heating element. The transmission line is configured to guide electromagnetic energy. The feed horn is connected to the transmission line and configured to convey the electromagnetic energy between the transmission line and a reflector. The reflector is spaced apart from the feed horn. The radome provides a cover extending from adjacent the reflector and covering at least a portion of at least one of the reflector, the transmission line, and the feed horn. The feed structure at least partially surrounds the transmission line. The heating element is proximal to the feed structure and is configured to provide heat to at least one of the radome, the reflector, the transmission line, and the feed horn.

In various embodiments, one or more of the following features may be included in the antenna. For instance, the heating element may be disposed on the feed structure. The heating element may be disposed internal to the feed structure. The heating element may be disposed on an inner surface of the feed structure between the feed structure and the transmission line. The heating element may be disposed on an outer surface of the feed structure between the feed structure and the radome. The heating element may be disposed on an end of the feed structure adjacent to the feed horn and may radiantly heat an inner surface of the radome facing the feed structure and the reflector. The heating element may radiantly heat the radome to ameliorate ice accumulation on the radome. The antenna may include an annular heat reflector having a curved cross-section and disposed adjacent to the heating element, the annular heat reflector configured to direct the heat from the heating element toward the radome. The antenna may include a fan proximal to the heating element and configured to cause movement of the heat relative to the radome. The feed structure may be a cylindrical tube extending annularly about the transmission line and defining a space between the feed structure and the transmission line, the space containing the heating element.

In various embodiments, the feed structure defines apertures at a first end of the feed structure, the apertures at the first end of the feed structure providing air inlet apertures. The feed structure may also define apertures at a second end of the feed structure opposite the first end, the apertures at the second end of the feed structure providing air outlet apertures. The antenna may also include a fan inside the feed structure that is configured to pass air over the heating element to warm the air and circulate the warmed air within a space defined between the reflector and the radome. The heating element may be disposed inside a heating element support tube that guides an airflow over the heating element.

In various embodiments, the feed structure defines apertures at a first end of the feed structure, the apertures at the first end of the feed structure providing air inlet apertures. The feed structure defines apertures at a second end of the feed structure opposite the first end, the apertures at the second end of the feed structure providing air outlet apertures. The air inlet apertures receive air from a space defined between the radome and the reflector to pass over and be warmed by the heating element. The air outlet apertures permit warmed air to exit the feed structure and circulate within the space defined between the radome and the reflector to warm the radome.

The antenna may also have a controller. The controller may be connected to the heating element to selectably activate and deactivate the heating element to maintain a temperature of the radome at a threshold temperature above freezing. The antenna may be a ground station antenna.

A warming system for a dish antenna is provided. The warming system may include a feed structure, an electrical heating element, and a controller. The feed structure may have at least one end to receive a transmission line such as a radio frequency (RF) waveguide of the dish antenna and may be configured for installation about the transmission line of the dish antenna. The electrical heating element may be attached to, or within, the feed structure. The controller may be connected to the electrical heating element and may be configured to activate the electrical heating element to warm at least a portion of the dish antenna to ameliorate ice accumulation on the dish antenna.

The warming system may have one or more additional features as well. For instance, the feed structure may be cylindrical and concentric about at least a portion of the transmission line (e.g., RF waveguide). The electrical heating element may be disposed on an external surface of the feed structure and may be configured to radiantly heat a radome of the dish antenna that at least partially encloses the feed structure between the radome and a reflector of the dish antenna.

The electrical heating element may be disposed on an internal surface of the feed structure and may be configured to heat air inside the feed structure for circulation through the feed structure and into a space at least partially defined between a radome of the dish antenna and a reflector of the dish antenna. The electrical heating element may be disposed inside the feed structure and connected to an inner surface of the feed structure, the system further including a fan also disposed inside the feed structure and configured to force air over the electrical heating element for heating. The electrical heating element may be disposed at an end of the feed structure adjacent to a feed horn of the dish antenna that is connected to an end of the transmission line (e.g., RF waveguide). In further embodiments, the feed structure is installed concentrically about the transmission line (e.g., RF waveguide), the transmission line is disposed between a reflector and a radome of the dish antenna, the radome is at least partially covering the reflector, and the electrical heating element radiantly heats the radome to ameliorate ice accumulation on the radome of the dish antenna.

A method of ameliorating ice accumulation on an antenna is provided. The antenna associated with the method may have (i) a transmission line with a feed horn, (ii) a reflector spaced away from the feed horn, and (iii) a radome at least partially enclosing at least a portion of the transmission line inside an enclosed space defined by the radome between the radome and the reflector. The method may include energizing, by a controller, an electrical heating element adjacent to the transmission line and disposed inside the enclosed space defined by the radome and the reflector. The method may include radiantly heating, by the electrical heating element, an inner surface of the radome to ameliorate ice accumulation on an outer surface of the radome. In various embodiments, the method includes detecting, by the controller, conditions corresponding to ice accumulation on the radome, and the energizing is in response to the detecting.

DETAILED DESCRIPTION

This disclosure relates generally to antenna systems, and more specifically, to a system and method for ameliorating ice and snow and other precipitation or condensation accumulation (referred to generally herein as "ice accumulation") on an antenna. Antennas are frequently placed in outdoor and exposed locations. For instance, antennas may be oriented for a clear view of the sky to communicate with satellites. However, such orientation exposes antennas to inclement or harsh conditions. In many instances, frozen precipitation and condensation may cause ice and snow to accumulate on components of the antenna. This ice accumulation may impede the transmission and reception of radio signals via the antenna. For example, the ice accumulation may alter dielectric characteristics, impedances, SWR ratios, resonant behavior, and/or other aspects of antenna components or signal paths. Ice accumulation may attenuate radio signals. The ice accumulation may interfere with the operation of motors that cause a reflector of an antenna to move and reposition.

Conventional efforts to address ice accumulation include covering components of an antenna with a radome. A radome is a cover that is often made from fabric or other material that will permit radio signals to pass through the cover while providing physical protection from precipitation. However, ice may accumulate on the cover, causing similar challenges that alter the proper operation of the antenna. Similarly, condensation may accumulate on the cover, such as inside the cover, which may alter the proper operation of the antenna, particularly if the condensation freezes.

Figure 1:
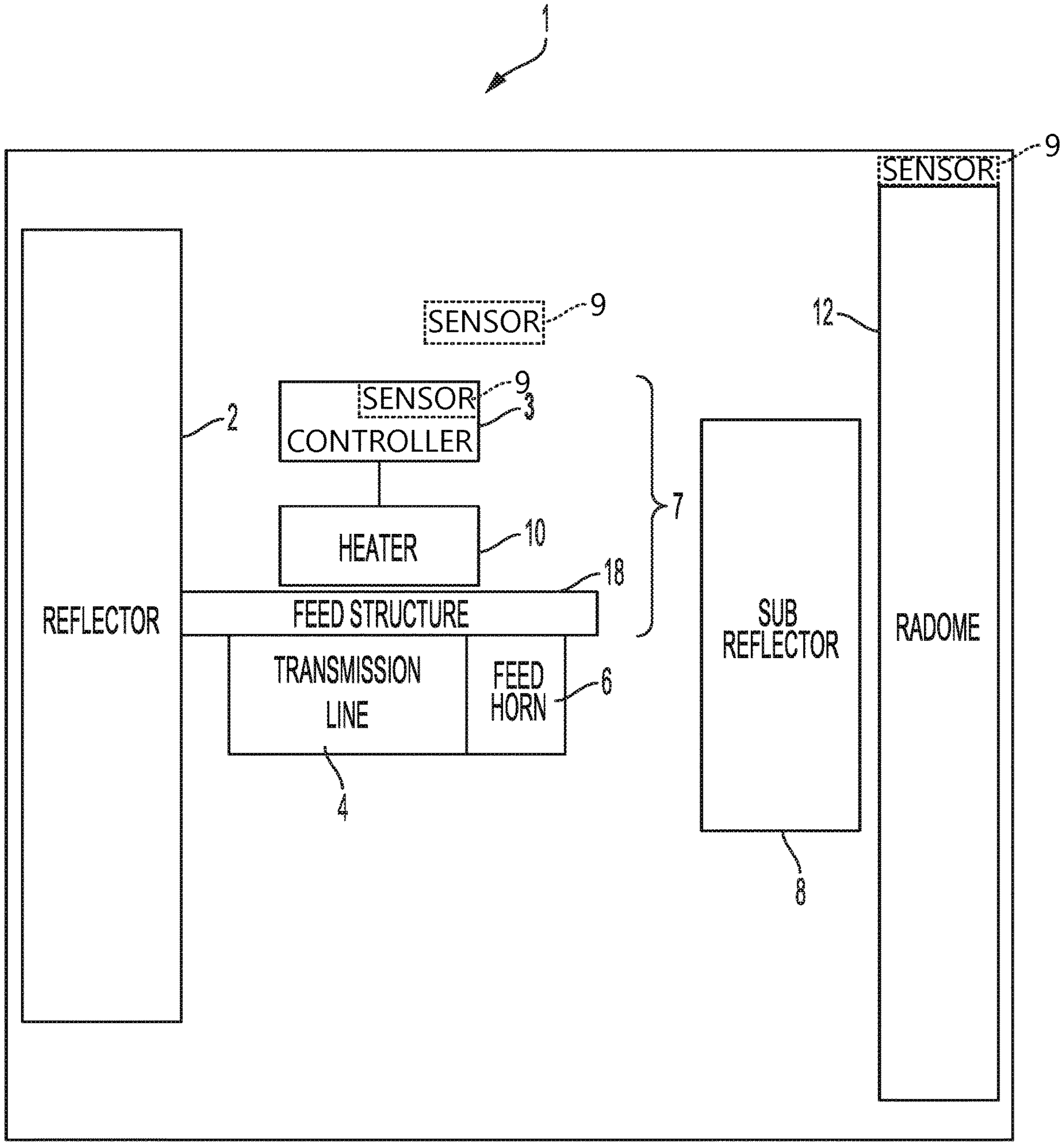
FIG. 1 illustrates an example block diagram of an antenna with features for ameliorating ice accumulation on the antenna, in accordance with various embodiments.

FIG. 1 is an example block diagram of an antenna 1. The antenna 1 may have a transmission line 4 that is configured to guide electromagnetic energy. A feed horn 6 may be connected to the transmission line 4. The feed horn 6 may be configured to convey the electromagnetic energy between the transmission line 4 and a reflector 2. The reflector 2 may be spaced apart from the feed horn 6. A radome 12 may comprise a cover extending from adjacent the reflector 2 and covering at least a portion of at least one of the reflector 2, the transmission line 4, and the feed horn 6. The antenna 1 may also have a feed structure 18 that at least partially surrounds the transmission line 4. The feed structure 18 may support other aspects of the system or provide physical protection to the transmission line 4. The antenna 1 may also include a heater assembly 10. The heater assembly 10 may include a heating element that is proximal to the feed structure 18 and configured to provide heat to at least one of the radome 12, the reflector 2, the transmission line 4, and the feed horn 6. In an example embodiment, a heating element is configured to heat one or more of the radome 12, the reflector 2, the transmission line 4, and the feed horn 6. In a further example embodiment, multiple heating elements are configured to heat one or more of the radome 12, the reflector 2, the transmission line 4, and the feed horn 6.

Ice accumulation on components of the antenna 1 may be ameliorated by the heat of the heater assembly 10. In some embodiments, the heater assembly 10 is between the reflector 2 and the radome 12. Thus, the heater assembly 10 may be said to be an internal aspect of the antenna 1. In other embodiments, the heater assembly 10 is opposite the radome 12 so that the radome 12 is between the heater assembly 10 and the reflector 2. Thus, the heater assembly 10 may be said to be an external aspect of the antenna 1. In such an embodiment, the radome 12 may cover the reflector 2 between the reflector 2 and the heater assembly 10 so that the heater assembly 10 is external to the reflector and emits energy back toward the radome 12 and the reflector 10 (for example, in a "prime focus" or "front feed" antenna). Thus, in various embodiments of the different configurations provided herein, a variation may be contemplated wherein the heater assembly 10 irradiates the radome 12 from an external side to ameliorate ice accumulation on the radome 12 and/or other aspects of the antenna 1 and a further variation may be contemplated wherein the heater assembly 10 irradiates the radome 12 from an internal side to ameliorate ice accumulation on the radome 12 and/or other aspects of the antenna 1. The heat of the heater assembly 10 may radiantly heat components of the antenna 1 and/or may warm air that moves in a space between the reflector 2 and the radome 12. In various embodiments, air is warmed by the heater assembly 10 between the reflector 2 and the radome 12, and the warmed air moves inside the space between the reflector 2 and the radome 12. In various instances, movement of the warmed air is caused passively by the mixing of lower density warm air and higher density cool air. Movement of the warmed air may be caused actively by a fan. Moving warm air further may ameliorate accumulation of condensation in the space between the reflector 2 and the radome 12, on components in this space, and on the radome 12.

The antenna 1 may have a controller 3. The controller 3 may be a computer processor, a thermostat, and/or a switch or contactor connected to the heater assembly 10 and configured to energize or deenergize the heater assembly 10 and/or control a magnitude of heat being generated by the heater assembly 10.

The controller 3 may include or be coupled to one or more sensor 9. For instance, the sensor 9 may detect conditions corresponding to ice accumulation, condensation accumulation, and so forth. The sensor 9 may be disposed inside the antenna 1 (i.e., in a space between the reflector 2 and the radome 12, mounted on an interior surface of the radome 12, or integrated with an internally disposed controller 3), outside of and mounted on an exterior of the radome 12, outside of and not mounted on the exterior of the radome 12, and so forth. When not integrated with the controller 3, the sensors 9 may be coupled to the controller 3 via a wired or wireless connection.

The conditions sensed or detected by the sensor 9 may include a sensed condensation, a sensed precipitation, a sensed temperature, a sensed humidity, a sensed dew point, a sensed rate of change of temperature, a sensed rate of change of dew point, a sensed rate of change of humidity, or the like. Such conditions may be useful to identify or indicate a sensed moisture accumulation inside and/or outside of the radome 12 or conditions conducive of such accumulation. The sensors 9 may comprise moisture sensors, temperature sensors, and other types of sensors. In some embodiments, the sensors 9 are optical, ultrasonic, capacitive, or other modality sensors. For example, the sensors 9 may include etched coils that detect when moisture bridges neighboring coils and changes an electrical characteristic thereof or optical sensors that use optics and optical signals to detect ice accumulation. Based on the sensed or detected conditions, the controller 3 may activate and/or deactivate the heater assembly 10, for example, via one or more internal or external switching components. Thus, the controller 3 may implement a variety of sensors 9 to sense conditions and activate or deactivate the heater assembly 10 to maintain operation of the antenna without ice or condensation accumulation.

In some embodiments, the controller 3 receives one or more signals from one or more of the sensor 9 and triggers the switching component to activate or deactivate the heating assembly 10 based on the received one or more signals. For example, if the controller 3 receives the signal from the sensor 9 indicating ice accumulation on the radome 12, the controller 3 may activate the heating assembly 10. The controller 3 may keep the heating assembly 10 activated until the sensor 9 no longer indicates ice accumulation on the radome 12 to the controller 3, at which point the controller 3 may deactivate the heating assembly 10. Similarly, where the sensor 9 comprises the temperature sensors, the controller 3 may activate the heating assembly 10 when the temperature detected by the sensor 9 falls below a threshold temperature and deactivate the heating assembly 10 when the temperature is greater than or equal to the threshold temperature. Similarly, where the sensor 9 comprises a dewpoint sensor, the controller 3 may activate the heating assembly 10 when condensation detected by the sensor 9 exceeds a threshold value and deactivate the heating assembly 10 when the condensation detected falls below or equal to the threshold value. Accordingly, the controller 3 may use the sensor 9 to monitor physical and/or environmental conditions of the antenna 1 to activate and deactivate the heating assembly 10 to maintain desired operation of the antenna 1 in the face of condensation buildup and corresponding interference.

In some embodiments, the sensor 9 comprises a sensor that measures one or more aspects of the antenna 1 or dielectric characteristics, impedances, SWR ratios, and/or resonant behavior of antenna components or signal paths associated with the antenna 1. For example, the controller 3 may determine that there is ice accumulation on the antenna 1 based on the measured one or more aspects, etc. exceeding one or more threshold values, and activate the heating assembly 10 via the switching component. The controller 3 may deactivate the heating assembly 10 via the switching component when the measured one or more aspects, etc., return to within the one or more threshold values. Accordingly, the controller 3 may use the sensor 9 to monitor operational conditions of the antenna 1 to activate and deactivate the heating assembly 10 to maintain desired operation of the antenna 1 in the face of condensation buildup and corresponding interference.

In some embodiments, the controller 3 is coupled to a memory configured to store one or more thresholds based on which the controller 3 deactivates and activates the heating assembly 10. The memory further may comprise instructions that control the controller 3 to activate and deactivate the heating assembly 10 based on the conditions sensed by the sensor 9.

In various embodiments, the combination of the controller 3, the heater assembly 10, and the feed structure 18 collectively may be called a warming system 7 for an antenna 1, such as a dish antenna.

Turning more specifically to each aspect of FIG. 1, the discussion will now elaborate on various non-limiting aspects and embodiments of each identified element of the block diagram of the antenna 1. The antenna 1 may be a dish antenna having a single reflector, or a dish antenna with a reflector and a sub reflector, or any configuration as desired. The antenna 1 may be a satellite communication antenna and may be implemented as a single antenna or in an array of other antennas. In various embodiments, the reflector 2 of the antenna 1 is of a diameter in a range between about 0.3 and about 100 meters or between about 1 and about 3 meters, or has a diameter of about 2.4 meters, or has a diameter of 2.4 meters, though the reflector 2 may be larger or smaller as desired. Moreover, the antenna 1 may be mounted on a building, or a pole, or the ground, or may be mounted on a vehicle, such as an aircraft, a wheeled vehicle, a waterborne vehicle, or any other vehicle as desired. Thus, the antenna 1 may be a ground station antenna, or a mobile antenna.

The transmission line 4 may comprise a tubular waveguide to guide microwave (or other) electromagnetic energy along a path. The transmission line 4 may be a trapezoidal waveguide or may be any waveguide shape. In various embodiments, the transmission line 4 is not a waveguide but is a coaxial cable. Similarly, the transmission line 4 may be another type of radio frequency transmission line, including at least quasi-optical systems such as beam waveguides using mirrors, and other transmission line types. In various embodiments, the transmission line 4 includes a layer of insulation on an outer surface of the transmission line 4. The insulation may limit heating of the transmission line 4 when the transmission line 4 is exposed to ambient or localized heat or heated air. In some embodiments, the insulation mitigates thermal expansion of the transmission line 4 which may have effects on the electrical or mechanical properties of the transmission line 4.

The feed horn 6 connected to the transmission line 4 may comprise a structure to transition the electromagnetic energy from the transmission line 4 and toward a reflector 2 of the antenna 1 and/or to transition electromagnetic energy from the reflector 2 of the antenna 1 and into the transmission line 4. The feed horn 6 may be a horn-style antenna or low-gain type antenna such as a half-wave dipole positioned to transition the electromagnetic energy between the transmission line 4 and the reflector 2. The feed horn 6 may be configured to match one or more electromagnetic impedance or to exhibit other electromagnetic characteristics. In various embodiments, the feed horn 6 is connected to the transmission line 4 and is structurally supported by the feed structure 18.

The reflector 2 may be a reflector of a single reflector antenna. The reflector 2 may be a reflector of a multi-reflector antenna, such as an antenna having the reflector 2 and a sub reflector 8. The reflector 2 may be a curved surface, or a series of surfaces, or a mesh surface, or any other surface configured to interact with electromagnetic energy and (i) focus the energy onto another reflector, (ii) focus the energy onto the feed horn, and/or (iii) direct the energy along a communication path. In various embodiments, the reflector 2 is a parabolic curved surface. In some embodiments, the antenna 1 may have the reflector 2 of varying shapes, such as circular, elliptical, semi-rectangular, and so forth.

As briefly mentioned, the antenna 1 may have the reflector 2 and the sub reflector 8. The reflector 2 and sub reflector 8 may be spaced apart, with the feed horn 6 oriented to convey the electromagnetic energy between the transmission line 4 and the sub reflector 8 and with the sub reflector 8 oriented to convey the electromagnetic energy between the sub reflector 8 and the reflector 2. The reflector 2 sends or receives the electromagnetic energy along a communication path. In this example embodiment, the reflector 2 may also be called a primary reflector. The sub reflector 8 may also be called a secondary reflector.

The radome 12 may include a fabric or other material that permits passage of electromagnetic energy but that also provides environmental protection against debris, animals, and/or ice accumulation. For instance, the radome 12 may protect the transmission line 4, feed horn 6, reflector 2, feed structure 18, and/or other aspects of the antenna from ice accumulation but may itself be subject to external ice accumulation which may be ameliorated by heat from the heater assembly 10. In various embodiments, the radome 12 comprises a fabric coated with a hydrophobic material such as polytetrafluoroethylene (PTFE), or may include synthetic nylon, or may include vinyl, or may be any material or any coated material as desired. The radome 12 may comprise a fabric having fibers infused with a hydrophobic material such as PTFE. The radome 12 may comprise PTFE-infused glass fibers. The radome 12 may comprise a tenting fabric. In various embodiments, the radome 12 comprises Sheergard® material available from Saint-Gobain Performance Plastics Corporation (Solon, Ohio) In various instances, the radome 12 has a configuration similar to a "shower bonnet" or may be a face radome of an antenna. Moreover, the heater assembly 10 and the radome may have complementary features. For instance, one or more of a spectrum of emitted infrared radiation from the heater assembly 10 and a material or color of the radome 12 may be selected to enhance heat transfer from the heater assembly 10 to the radome 12.

Finally, the feed structure 18 may comprise a structure to protect and/or support the transmission line 4 and/or feed horn 6. The feed structure 18 may also be called a feed can. In various embodiments, the feed structure 18 is a part of the heater assembly 10 and provides a mounting surface for one or more heating element of the heater assembly 10. In various embodiments, the feed structure 18 is a conventional antenna component to provide structural support to a feed horn 6 or protection to a transmission line 4. The heater assembly 10 may be incorporated into or connected to the feed structure 18 which may provide support for heating elements of the heater assembly 10.

In various embodiments, the heater assembly 10 may include a heating element and structures to support and orient the heating element. For instance, the heater assembly 10 may include a wire or other component that generates heat when electrical current passes through the wire. The heater assembly 10 may include an element that generates infrared energy such as light. The heater assembly 10 may include one or more fans to cause heated air to move or circulate and contact aspects of the antenna 1. The heater assembly 10 may include one or more reflectors to direct generated heat. The heater assembly 10 may include different aspects in different combinations. Much of the following discussion relates to different example embodiments of the heater assembly 10 that may be configured in different ways to cause heating elements to provide heat to at least one of the radome 12, the reflector 2, the transmission line 4, and the feed horn 6.

Figure 2A:
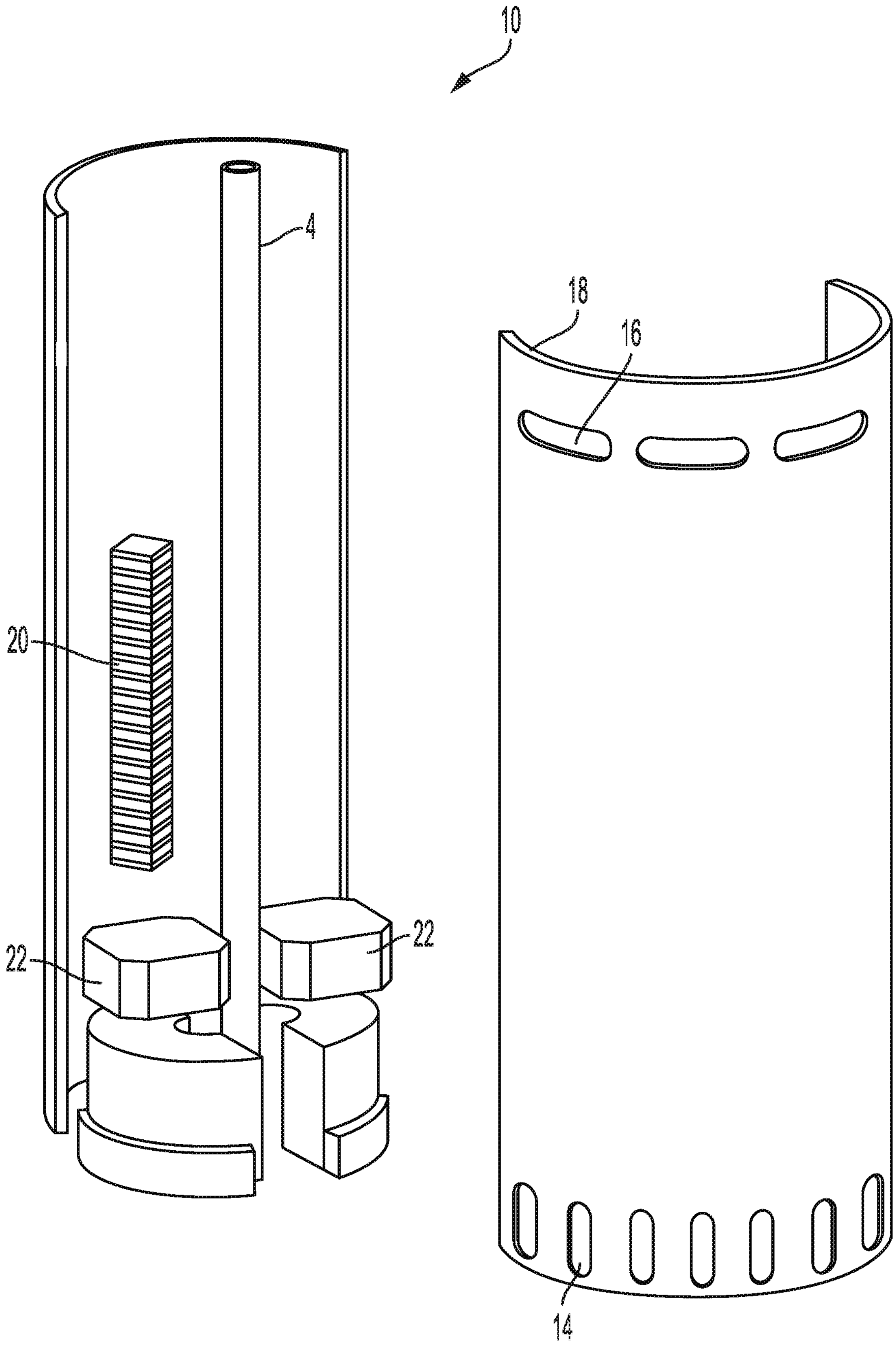
FIGS. 2A-B illustrate an example embodiment of a heater assembly for the antenna having a heating element and a fan inside a feed structure, in accordance with various embodiments.
Figure 2B:
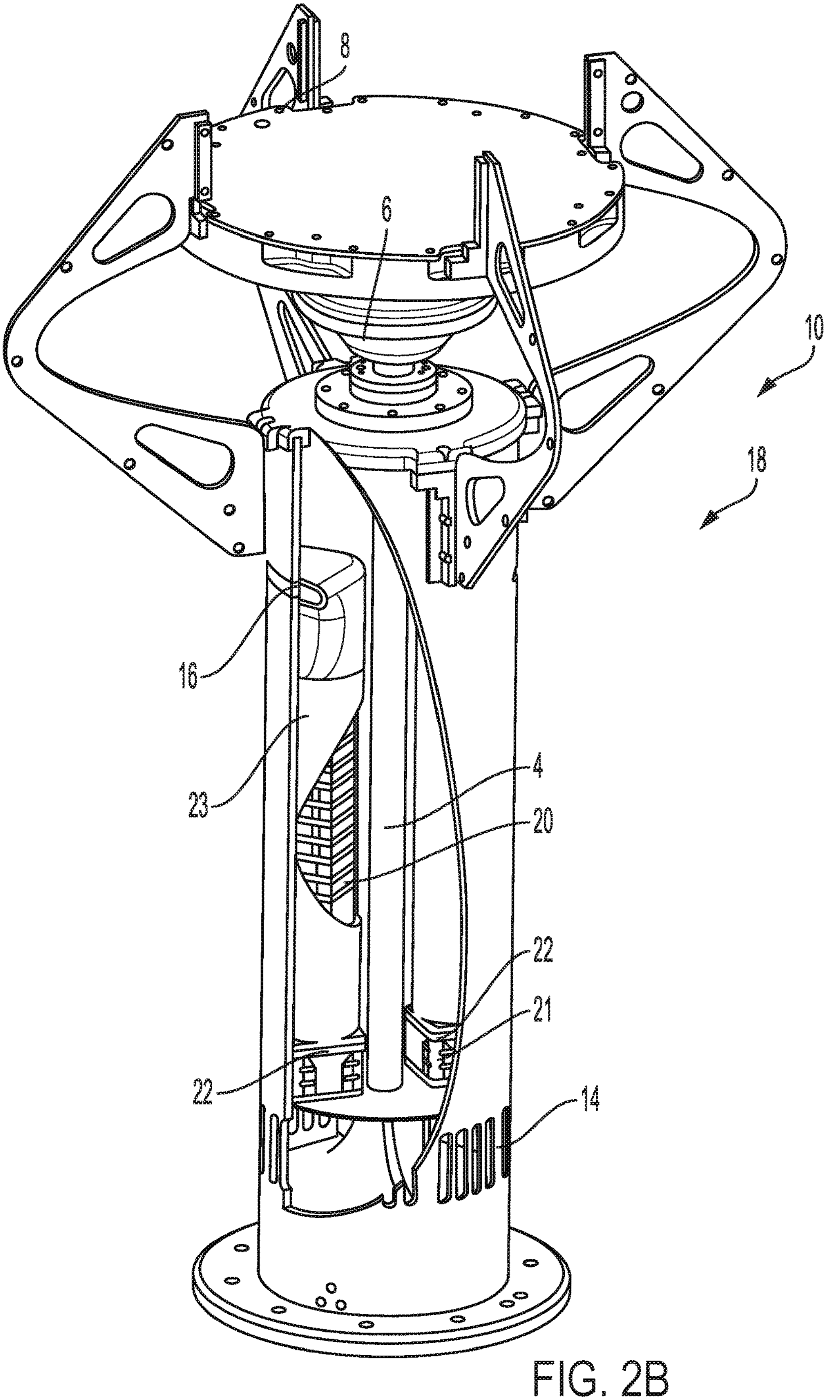

Having introduced various aspects of the antenna 1, attention is now directed to FIGS. 2A-B for a discussion of example embodiments of the antenna 1 and particularly, example configurations of the heater assembly 10. FIG. 2A depicts aspects of a heater assembly 10 and feed structure 18, and FIG. 2B illustrates one example implementation of a heater assembly 10 in connection with a feed structure 18 also supporting a feed horn 6 and a sub reflector 8. FIG. 2A illustrates the heating element 20 inside the feed structure 18 while FIG. 2B illustrates the heating element 20 inside the feed structure 18 and also enclosed in and supported by a heating element support tube 23. These aspects will be discussed in further detail below.

Referring to both FIGS. 2A and 2B, in various embodiments, the feed structure 18 comprises a tube. The feed structure 18 may extend around the transmission line 4 and be in a space between the reflector 2 and the feed horn 6. The feed structure 18 may have a cylindrical cross-section and may extend circumferentially around the transmission line 4. The feed structure 18 may be other shapes rather than cylindrical. For instance, the feed structure 18 may have a trapezoidal cross-section.

The feed structure 18 may include air inlet apertures 14 and air outlet apertures 16 defined through the tube of the feed structure 18. The heating element 20 is disposed inside the tube of the feed structure 18 in a space between the air inlet apertures 14 and air outlet apertures 16. Furthermore, in some embodiments, the heating element 20 is also within the heating element support tube 23 which aides in supporting the heating element 20 and directing airflow over the heating element 20. Air entering the air inlet apertures 14 passes along a path internally through the tube of the feed structure 18, over the heating element 20 disposed inside the heating element support tube 23, or disposed directly inside the tube of the feed structure 18, and exits the feed structure 18 through the air outlet apertures 16. The warmed air may then circulate in the space between the reflector 2 and the radome 12 of the antenna 1 and ameliorate ice accumulation. In various embodiments, one or more fan 22 is also inside the feed structure 18 and between the air inlet apertures 14 and air outlet apertures 16 to draw air into the air inlet apertures 14, cause the air to pass over the heating element 20, and expel the air from the air outlet apertures 16. In various embodiments, the one or more fan 22 is adjacent the air inlet apertures 14. In other embodiments, the one or more fan 22 is adjacent the air outlet apertures 16. In further embodiments, the one or more fan 22 is adjacent the air inlet apertures 14 and one or more other fan 22 is adjacent the air outlet apertures 16. Though not shown, the heating element 20 can be alternatively or additionally disposed on the outside of the tube in a space between the air inlet apertures 14 and air outlet apertures 16 or adjacent to the air inlet apertures 14. The one more fan 22 may cause air to flow about the space between the reflector 2 and the radome 12, for example, along a path through the tube via the air inlet apertures 14 and the air outlet apertures 16.

Figure 3:
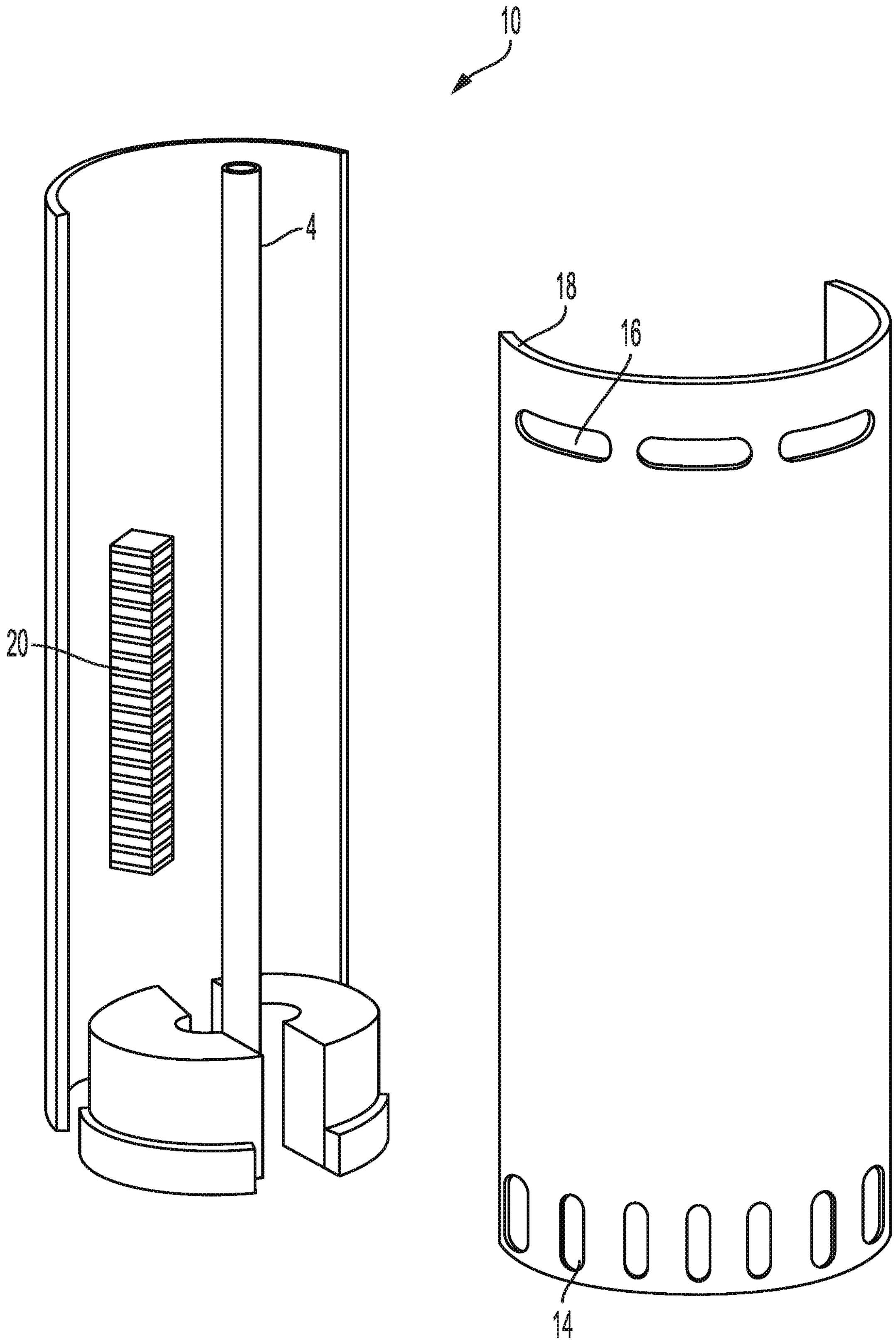
FIG. 3 illustrates an example embodiment of a heater assembly for the antenna having the heating element inside the feed structure, in accordance with various embodiments.

Turning to FIG. 3, in another example embodiment, the heater assembly 10 is configured similarly to that of FIGS. 2A-B but omitting the one or more fan 22. For instance, air flow may be impelled passively, such as by the expansion (e.g., lowering density) of air as the air is heated. As with FIGS. 2A-B, the heater assembly 10 includes the feed structure 18 comprising the tube. The tube may extend around the transmission line 4 and be in the space between the reflector and the feed horn 6. The tube may have the cylindrical cross-section and may extend circumferentially around the transmission line 4. The tube may be other shapes rather than cylindrical. For instance, the tube may have a trapezoidal cross-section.

The feed structure 18 may include air inlet apertures 14 and air outlet apertures 16 defined through the tube. The heating element 20 is disposed inside the tube of the feed structure 18 in the space between the air inlet apertures 14 and air outlet apertures 16. Air that enters the tube via the inlet apertures 14 is heated by the heating element 20 and expands and rises, exiting the feed structure 18 through the air outlet apertures 16. Cooler air enters the air inlet apertures 14 to replace the air that exits the air outlet apertures 16 and is warmed by the heating element 20, so that the cooler air passes along a path internally through the tube of the feed structure 18, over the heating element 20 disposed inside the tube of the feed structure 18 and exits the feed structure 18 through the air outlet apertures 16. The warmed air may then passively circulate in a space between the reflector and the radome of the antenna and ameliorate ice accumulation. Thus, in an example embodiment, the heater assembly 10 is a passive air flow heater assembly.

Figure 4A:
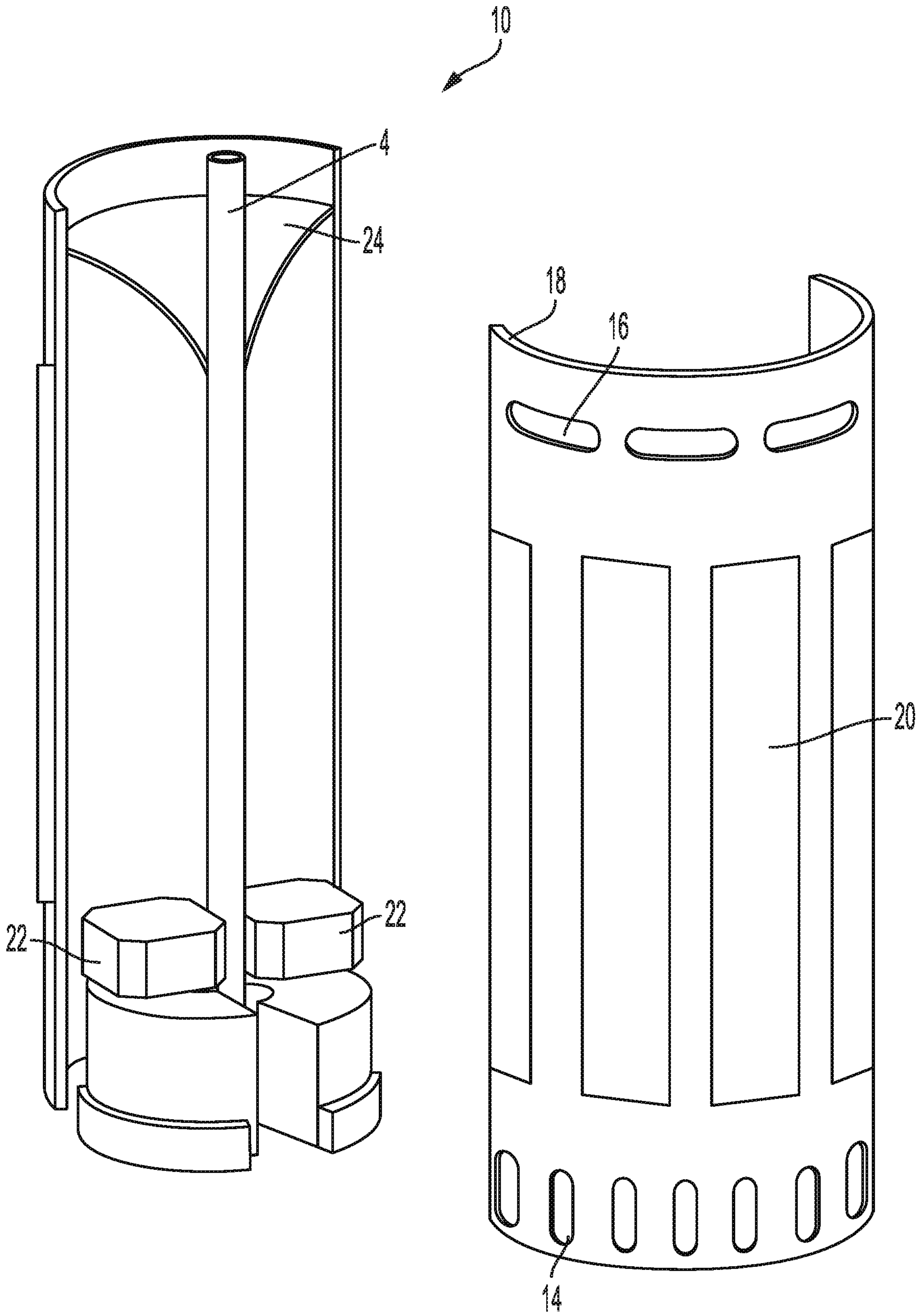
FIGS. 4A-B illustrate an example embodiment of a heater assembly for the antenna having the heating element outside the feed structure and a fan inside the feed structure, in accordance with various embodiments.
Figure 4B:
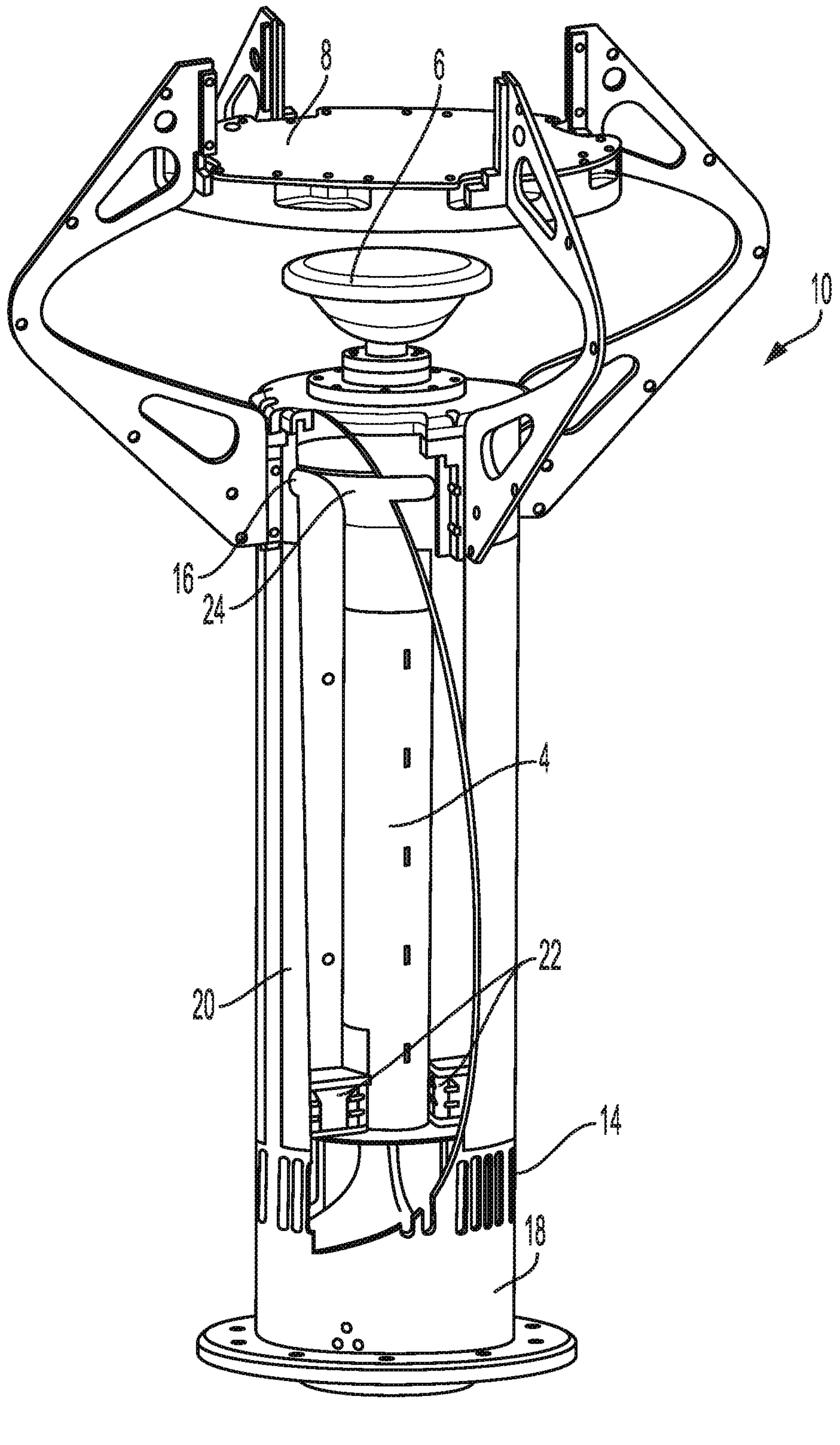

FIG. 4A shows another embodiment of the heater assembly 10 and FIG. 4B illustrates one example implementation of the heater assembly 10 of FIG. 4A in connection with the feed structure 18 supporting the feed horn 6 and the sub reflector 8. In various embodiments, the heater assembly 10 includes the feed structure 18 comprising the tube. The tube may extend around the transmission line 4 and be in the space between the reflector and the feed horn 6. The tube may have the cylindrical cross-section and may extend circumferentially around the transmission line 4. The tube may be other shapes rather than cylindrical. For instance, the tube may have the trapezoidal cross-section.

The feed structure 18 may include air inlet apertures 14 and air outlet apertures 16 defined through the tube. The feed structure 18 may include an air outlet deflector 24 comprising a curved or otherwise shaped flange adjacent to the air outlet apertures 16. The curved flange extends between an inner surface 42 of the tube of the feed structure 18 and an outer surface 44 of the transmission line 4 to provide an at least partial fluidic seal. The air outlet deflector 24 directs air flowing inside the feed structure 18 toward the air outlet apertures 16.

In an example embodiment, the heating element 20 is disposed on the outside of the cylindrical tube of the feed structure 18 in a space between the air inlet apertures 14 and air outlet apertures 16. Air entering the air inlet apertures 14 passes along a path internally through the feed structure 18. Because the feed structure 18 is warmed by the heating element 20, the air warms as it travels inside the space within the feed structure 18 between the air inlet apertures 14 and the air outlet apertures 16. The air exits the feed structure 18 through the air outlet apertures 16. The air outlet deflector 24 redirects airflow from a generally axial direction through the feed structure 18 to a generally radial direction through the air outlet apertures 16. Stated differently, the air outlet deflector 24 redirects airflow from a direction generally along a length of the tube of the feed structure 18 to a direction perpendicularly or generally away from the tube of the feed structure 18, through the air outlet apertures 16. The warmed air may then circulate in the space between the reflector and the radome of the antenna and ameliorate ice accumulation. In various embodiments, multiple heating elements 20 may be disposed on the outside of the cylindrical tube of the feed structure 18. For instance, heating elements 20 may be oriented along a length of the feed structure 18 and spaced apart around the circumference of the feed structure 18 or oriented circumferentially around the feed structure 18 and spaced apart vertically along the feed structure 18 (not shown).

In various embodiments, one or more fan 22 is also or instead inside the feed structure 18 and between the air inlet apertures 14 and air outlet apertures 16 to draw air into the air inlet apertures 14, where it is warmed by the feed structure 18, and to expel the warmed air from the air outlet apertures 16. In various embodiments, the one or more fan 22 is adjacent the air inlet apertures 14. In other embodiments, the one or more fan 22 is adjacent the air outlet apertures 16. In further embodiments, one or more fan 22 is adjacent the air inlet apertures 14 and one or more other fan 22 is adjacent the air outlet apertures 16.

Moreover, because the heating element(s) 20 is/are on an outside of the tube of the feed structure 18, the heating element(s) 20 may also radiantly heat nearby structures, such as the radome of the antenna. Thus, both radiant heat from the heating element(s) 20 and convective heat from moving air may provide amelioration of ice accumulation on the antenna. Yet furthermore, the moving air exiting the air outlet apertures 16 encourages movement of heat about different antenna structures by introducing fluid turbulence in static air pockets adjacent to the heater assembly 10. Moving air also may contribute to drying of accumulated condensation on an inner surface of the radome.

Figure 5:
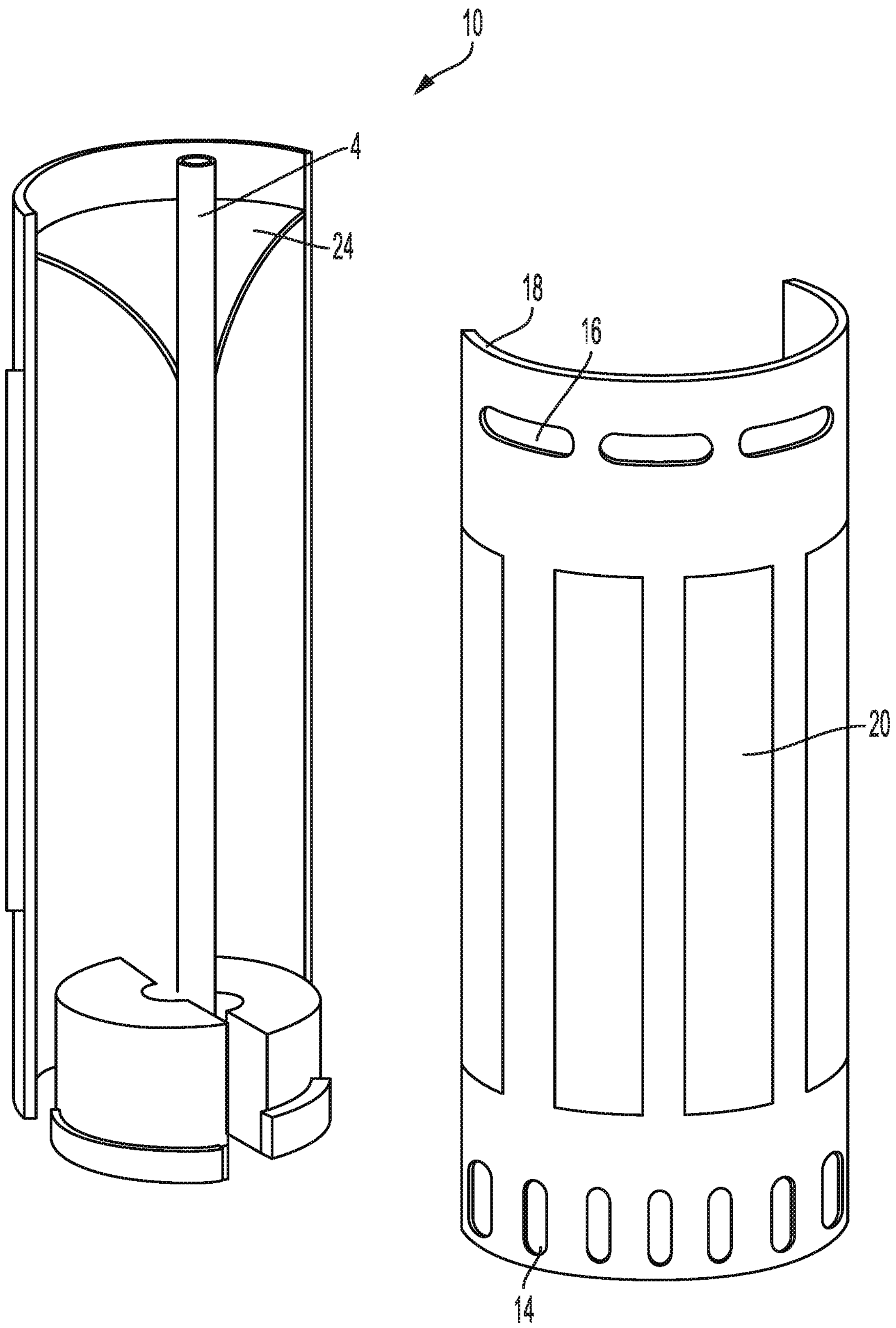
FIG. 5 illustrates an example embodiment of a heater assembly for the antenna having the heating element outside the feed structure, in accordance with various embodiments.

Turning to FIG. 5, in another example embodiment, the heater assembly 10 is configured similarly to that of FIGS. 4A-B but omitting the one or more fan 22. For instance, air flow may be impelled by expansion (e.g., lowering density of air as the air is heated). Stated another way, passive air flow may be generated by heater assembly 10 in this example embodiment. As with FIG. 4A-B, the heater assembly 10 includes the feed structure 18 comprising the tube. The feed structure 18 may extend around the transmission line 4 and may be in the space between the reflector and the feed horn 6. The tube of the feed structure 18 may have the cylindrical cross-section and may extend circumferentially around the transmission line 4. The tube of the feed structure 18 may be other shapes rather than cylindrical. For instance, the tube may have the trapezoidal cross-section.

The feed structure 18 may include air inlet apertures 14 and air outlet apertures 16 defined through the tube. The feed structure 18 may include an air outlet deflector 24 comprising a curved or otherwise shaped flange adjacent to the air outlet apertures 16. The curved flange extends between an inner surface 42 of the tube of the feed structure 18 and an outer surface 44 of the transmission line 4 to provide an at least partial fluidic seal. The curved flange directs air flowing inside the feed structure 18 toward the air outlet apertures 16.

One or more heating element 20 is disposed on an outside of the feed structure 18 in the space between the air inlet apertures 14 and air outlet apertures 16. Though not shown, the one or more heating element 20 can be alternatively or additionally disposed on the inside of the feed structure 18 in the space between the air inlet apertures 14 and air outlet apertures 16. Air entering the air inlet apertures 14 passes along a path internally through the feed structure 18. Because the feed structure 18 is warmed by the one or more heating element 20, the air warms as it travels inside the space within the feed structure 18 between the air inlet apertures 14 and the air outlet apertures 16. The air exits the feed structure 18 through the air outlet apertures 16. The air outlet deflector 24 redirects airflow from a generally axial direction through the feed structure 18 to a generally radial direction through the air outlet apertures 16. Stated differently, the air outlet deflector 24 redirects airflow from a direction generally along a length of the feed structure 18 to a direction generally perpendicularly away from the feed structure 18, through the air outlet apertures 16. The warmed air may then circulate in the space between the reflector and the radome of the antenna and ameliorate ice accumulation and may dry accumulated condensation.

Because the one or more heating element 20 is on the outside of the tube of the feed structure 18, the heating element 20 also radiantly heats nearby structures, such as the radome of the antenna. Thus, both radiant heat from the one or more heating element 20 and convective heat from moving air ameliorate ice or condensation accumulation on the antenna. Yet furthermore, the moving air exiting the air outlet apertures 16 encourages movement of heat about different antenna structures by introducing fluid turbulence in static air pockets adjacent to the heater assembly 10.

Figure 6:
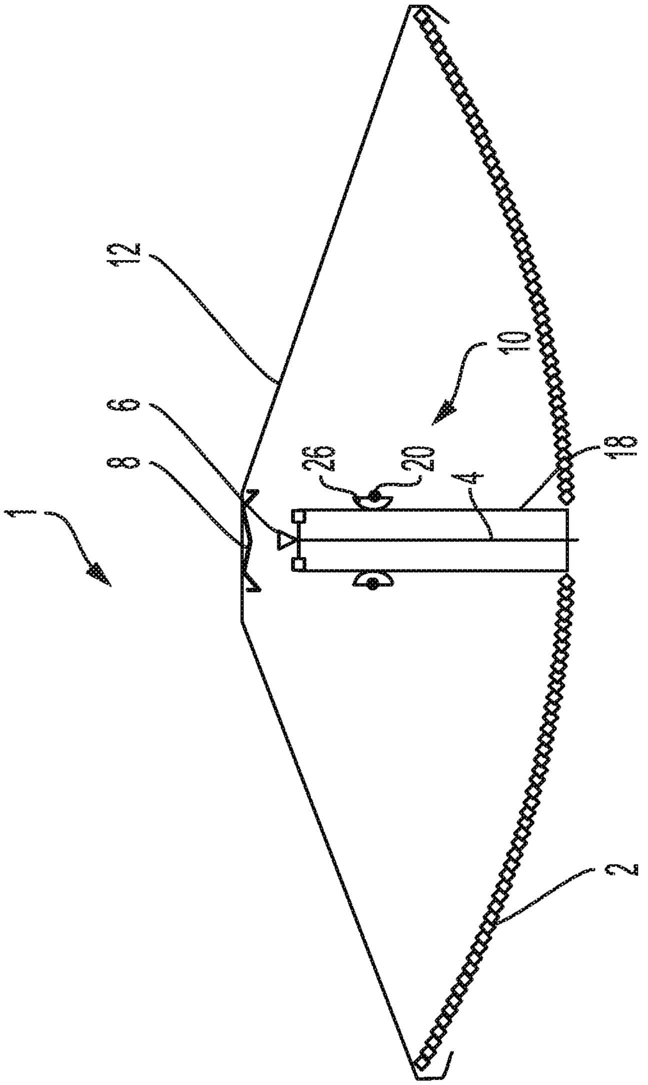
FIG. 6 illustrates an example embodiment of a heater assembly for the antenna having the heating element outside the feed structure with a heat reflector, in accordance with various embodiments.

Turning to FIG. 6, another embodiment of the heater assembly 10 is depicted. FIG. 6 shows a cross-section view of an antenna 1 and omits various details of the heater assembly 10 to facilitate a clearer reproduction in the Figure. In addition, FIG. 6 provides a helpful representation of a relationship between an example radome 12 and a reflector 2. This representation is illustrative for the other embodiments discussed herein but having differently configured heater assemblies 10. One will appreciate that features of the other embodiments provided herein may also be incorporated in the embodiment illustrated in FIG. 6 and vis-a-versa.

In some embodiments, the antenna 1 may correspond to a Cassegrain antenna. By integrating the features described herein with a Cassegrain antenna, the various aspects of the antenna 1 described herein can be operated without interfering with or reducing the benefits provided by the Cassegrain antenna over, for example, prime focus antennas. For example, by mounting the heater assembly 10 on the feed structure 18, no portion or a reduced portion of a beam associated with the antenna 1 is blocked or impeded by the heater assembly or other components of the antenna 1 as compared to the prime focus antennas, and so forth.

The antenna 1 may include the transmission line 4 in electromagnetic communication with the feed horn 6. The feed horn 6 conveys electromagnetic energy between the transmission line 4 and the sub reflector 8. The sub reflector 8 conveys electromagnetic energy between the feed horn 6 and the reflector 2. The reflector 2 communicates electromagnetic energy between the sub reflector 8 and the signal path. In various instances, ice may accumulate on the antenna 1. For example, the radome 12 is depicted to provide physical protection to aspects of the antenna 1. However, ice may accumulate on the radome 12, or condensation collected between the radome 12 and the reflector 2 of the antenna 1 may freeze inside an enclosed space defined by the radome 12 and the reflector 2.

The heater assembly 10 is illustrated. The heater assembly 10 includes the feed structure 18 comprising the tube. The feed structure 18 may support the feed horn 6 and the sub reflector 8. The tube of the feed structure 18 may extend around the transmission line 4 and be in the space between the reflector 2 and the feed horn 6. The tube of the feed structure 18 may have a cylindrical cross-section and may extend circumferentially around the transmission line 4. The tube may be other shapes rather than cylindrical. For instance, the tube may have a trapezoidal cross-section.

In accordance with various example embodiments, any of the configurations discussed herein may suitably be used in connection with the antenna 1 of FIG. 6. However, as illustrated in FIG. 6, in an example embodiment, one or more heating element 20 is disposed on the outside of the feed structure 18. The heating element 20 extends around a circumference of the feed structure 18. The heating element 20 may be a wire that generates heat when an electrical current is passed through the wire. The heating element 20 may both warm air in the space between the reflector 2 and the radome 12 and also emit infrared radiation that travels through the space between the reflector 2 and the radome 12 to warm the radome 12 or other aspects of the antenna 1 (not specifically shown).

In this example embodiment, a heat reflector 26 may be placed between the heating element 20 and the feed structure 18. The heat reflector 26 may comprise an annulus, curved or other ring-like structure, or other shaped structure disposed about the feed structure 18. The heat reflector 26 may have a curved or other shaped cross-section and redirect heat from the heating element 20 away from the feed structure 18 and toward other structures of the antenna 1, such as the radome 12. Stated differently, the annular heat reflector 26 may have a curved cross-section and be disposed adjacent to the heating element 20 to direct the heat from the heating element 20 toward the radome 12. In some embodiments, one or more of a combination of the heat reflector 26 with the heating element 20 may be placed in one or more locations along the feed structure 18. In some embodiments, the one or more of the combination of the heat reflector 26 with the heating element 20 may not fully extend around the circumference of the feed structure 18 and instead be positioned at one or more locations around the circumference of the feed structure 18. Alternatively, the positioning or the orientation of the heat reflector 26 may be varied to direct the heat to a particular portion of the radome 12 and/or aspect of the antenna 1.

Figure 7A:
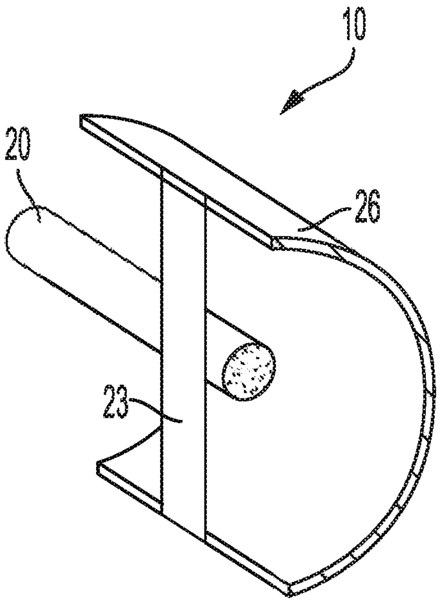
FIGS. 7A-C illustrate different configurations of heater assemblies having a heating element and heat reflector and structures supporting the heating element in a position relative to the heat reflector, in accordance with various embodiments.

FIG. 7A illustrates a close-up view of one example embodiment of selected features of the heater assembly 10 of FIG. 6. In FIG. 7A, the heater assembly 10 includes the heat reflector 26 and the heating element 20, as well as structures to support the heating element 20 in spaced apart relation from the heat reflector 26. For example, the heater assembly 10 may comprise a support bar 23. The support bar 23 comprises a flange, wire, or other structure extending between edges or locations of the heat reflector 26 to maintain the heating element 20 in spaced apart relation from the heat reflector 26.

Figure 7B:
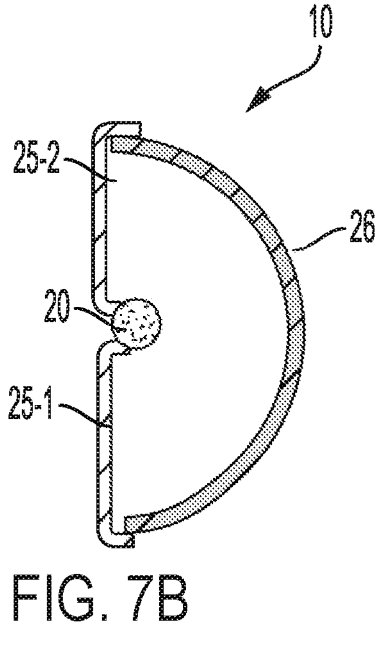

FIG. 7B illustrates a close-up view of another example embodiment of selected features of a heater assembly 10 of FIG. 6. In FIG. 7B, the heater assembly 10 includes the heat reflector 26 and the heating element 20, as well as structures to support the heating element 20 in spaced apart relation from the heat reflector 26. For example, the heater assembly 10 may comprise support brackets 25-1, 25-2. The support brackets 25-1, 25-2 are paired flanges. A first flange extends from one edge or location of the heat reflector 26 to the heating element 20 and a second flange extends from an opposite edge or other location of the heat reflector 26 to hold the heating element 20 in spaced apart relation from the heat reflector 26.

Figure 7C:
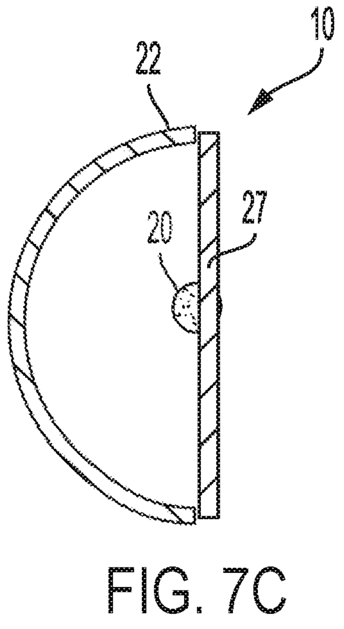

FIG. 7C illustrates a close-up view of a further example embodiment of selected features of a heater assembly 10 of FIG. 6. In FIG. 7C, the heater assembly 10 includes the heat reflector 26 and the heating element 20, as well as structures to support the heating element 20 in spaced apart relation from the heat reflector 26. For example, the heater assembly 10 may comprise a mounting plate 27. The mounting plate 27 is a plate that the heating element 20 can be attached to or integrally formed with. The plate may be made of a heat transmissive material, such as a heat-tolerant plastic that is optically transmissive in the infrared spectrum. The heating element 20 may be mounted on either side (or different locations) of the mounting plate 27. For example, the mounting plate 27 extends between opposing edges of the heat reflector 26 to support the heating element 20 in spaced apart relation from the heat reflector 26. Moreover, in various example embodiments, the heating element 20 may be supported spaced apart from the heat reflector 26 using any suitable structure.

Figure 8A:
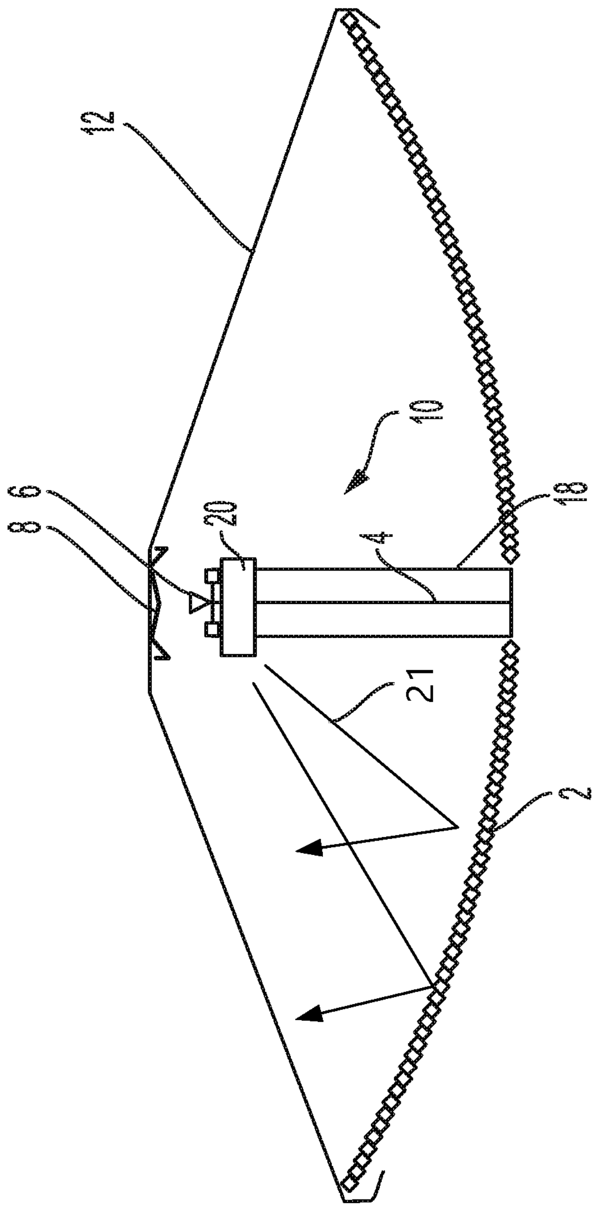
FIGS. 8A-B illustrate example embodiments of heater assemblies for the antenna, in accordance with various embodiments.

Turning to FIG. 8A, another embodiment of the heater assembly 10 is depicted. FIG. 8A shows a cross-section view of an antenna 1 and omits various details of the heater assembly 10 to facilitate a clearer reproduction in the figure. However, one will appreciate that features of the aforementioned embodiments may also be incorporated in the embodiment illustrated in FIG. 8A and vis-a-versa. The antenna 1 may include the transmission line 4 in electromagnetic communication with the feed horn 6. The feed horn 6 conveys electromagnetic energy between the transmission line 4 and the sub reflector 8. The sub reflector 8 conveys electromagnetic energy between the feed horn 6 and the reflector 2. The reflector 2 communicates electromagnetic energy between the sub reflector 8 and the signal path. In various instances, ice may accumulate on the antenna 1. For example, the radome 12 is depicted to provide physical protection to aspects of the antenna 1. However, ice may accumulate on the radome 12, or condensation may collect between the radome 12 and the reflector 2 of the antenna 1 or on the exterior of the radome 12. The condensation may freeze inside an enclosed space defined by the radome 12 and the reflector 2 or on the exterior of the radome 12.

The heater assembly 10 is illustrated. The heater assembly 10 includes the feed structure 18 comprising the tube. The feed structure 18 supports the feed horn 6 and the sub reflector 8. The tube may extend around the transmission line 4 and be in a space between the reflector 2 and the feed horn 6. The feed structure 18 may have the cylindrical cross-section and may extend circumferentially around the transmission line 4. The feed structure 18 may be other shapes rather than cylindrical. For instance, the feed structure 18 may have the trapezoidal cross-section.

The heating element 20 is disposed at an end of the feed structure 18. The heating element 20 may be adjacent to the feed horn 6. The heating element 20 may be disposed along the feed structure 18 at a location nearest a focal point of the antenna, such as immediately below or near the feed horn 6 as mounted on the feed structure 18. By placing the heating element 20 near the feed horn 6, the heating element is located near the focal point of the antenna, thereby enabling more efficient use of the reflective properties of the reflector 2 help distribute heat generated by the heating element 20 to various locations of the radome 12. The heating element 20 may be a wire that generates heat when an electrical current is passed through the wire or any other heating element 20 configured to generate and radiate heat in a directed (i.e., infrared radiation) or undirected manner, such as emitted radiation 21 as shown. The heating element 20 may both warm air in the space between the reflector 2 and the radome 12 and also emit infrared radiation that travels through the space between the reflector 2 and the radome 12.

Figure 8B:
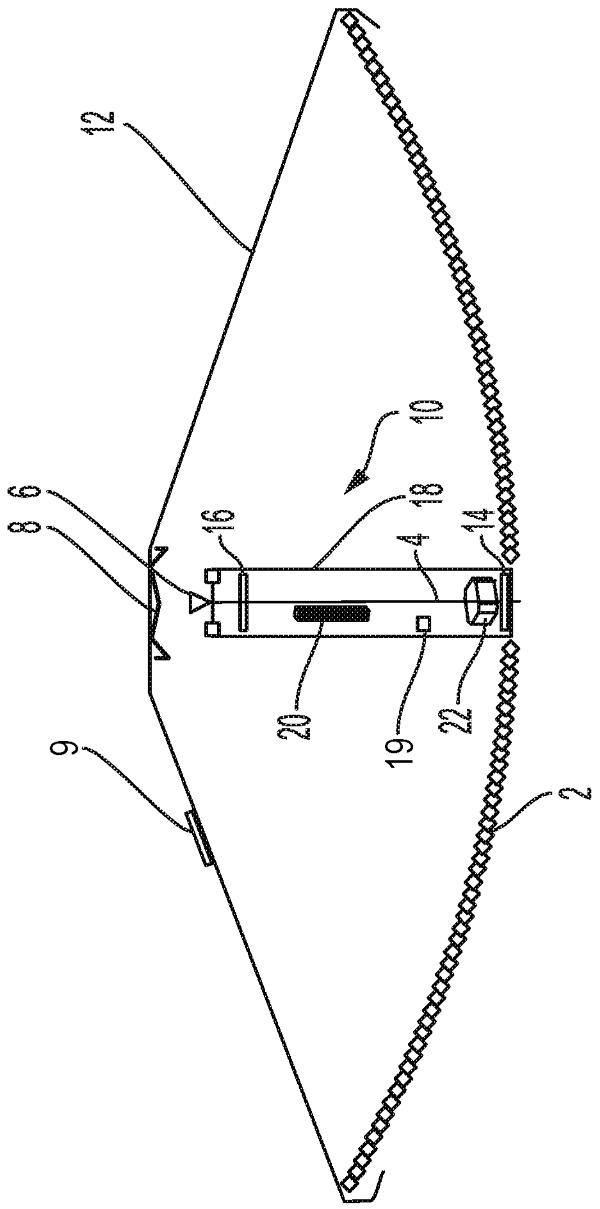

Turning to FIG. 8B, another embodiment of the heater assembly 10 is depicted. Like FIG. 8A, FIG. 8B shows a cross-section view of an antenna 1 and omits various details of the heater assembly 10 to facilitate a clearer reproduction in the figure. However, one will appreciate that features of the aforementioned embodiments may also be incorporated in the embodiment illustrated in FIG. 8B and vis-a-versa. The antenna 1 depicted in FIG. 8B includes many of the details of the antenna 1 depicted in FIG. 8A. However, instead of using the heater assembly 10 to heat the radome 12, for example, via reflected infrared radiation as in the antenna 1 of FIG. 8A, the antenna 1 of FIG. 8B employs active air flow to heat the radome 12. Specifically, FIG. 8B shows airflow in the space between the radome 12 and the reflector 2 where the one or more fan 22 directs air through the feed structure 18 from the air inlet apertures 14 to the air outlet apertures 16 across the heating element 20.

In some embodiments, the controller 3 of the warming system 7, though not shown in this Figure, may receive a signal from the one or more sensor 9 mounted to detect ice accumulation on the radome 12. In response to detection of ice accumulation or conditions conducive to ice or condensation accumulation, the controller 3 may activate the heating element 20 and the one or more fan 22 to circulate warm air to reduce or prevent the ice or condensation accumulation. In some embodiments, the controller 3 may monitor an air flow sensor and/or temperature sensor 19 or the like to monitor conditions (such as temperature, movement of air, etc.) within the antenna 1 in conjunction with the sensor 9 to activate and deactivate the heating element 20 and/or the one or more fan 22. For example, the controller 3 may activate the heating element 20 based on receiving a signal from the sensor 9 that ice is accumulating on the radome 12. The controller 3 may maintain the heating element 20 in an active state until the sensor 9 no longer detects ice or an internal temperature exceeds a threshold temperature. Once the sensor 9 no longer detects ice or when the internal temperature exceeds the threshold temperature, the controller 3 may deactivate the heating element 20. In some embodiments, the controller 3 may activate the one or more fan 22 when the heating element 20 is activated and keep the one or more fan 22 operating to continue to circulate the air within the space in the antenna 1 after the heating element 22 is deactivated. In some embodiments, the controller 3 may monitor the flow sensor 19 to ensure that air is flowing (for example, from the one or more fan 22 being active) when or before the heating element 20 is activated. Such monitoring may prevent heat damage to one or more components of the antenna 1.

Having discussed a variety of configurations of the antenna 1 initially introduced with reference to FIG. 1, a few further specific examples and configurations may be contemplated. For instance, referring to FIG. 1 and also with aid of FIGS. 2A through 8B, an antenna 1 may include a transmission line 4 configured to guide electromagnetic energy. The antenna 1 may have the feed horn 6 connected to the transmission line 4 and configured to convey the electromagnetic energy between the transmission line 4 and the reflector 2. The reflector 2 is spaced apart from the feedhorn. The radome 12 provides a cover extending from adjacent the reflector 2 and covering at least a portion of at least one of the reflector 2, the transmission line 4, and the feed horn 6. Additionally, the feed structure 18 at least partially surrounds the transmission line 4 and the heating element 20 is proximal to the feed structure 18 and configured to provide heat to at least one of the radome 12, the reflector 2, the transmission line 4, and the feed horn 6.

As discussed in the preceding paragraphs, variations in configuration are possible. For example, the heating element 20 can be disposed in various different orientations and can comprise various different heating components. The heating element 20 may be resistive, inductive, light-emitting, or may implement a combination of properties to generate heat. The heating element 20 may be disposed on the feed structure 18. The heating element 20 may be disposed internal to the feed structure 18. The heating element 20 could be disposed on an inner surface of the feed structure 18 between the feed structure 18 and the transmission line 4. The heating element 20 could be disposed on an outer surface of the feed structure 18 between the feed structure 18 and the radome 12. The heating element 20 could be disposed on an end of the feed structure 18 adjacent to the feed horn 6 and may radiantly heat an inner surface of the radome 12 facing the feed structure 18 and the reflector 2. The heating element 20 could be mounted near a heat reflector 26. For instance, an annular heat reflector 26 could have a curved cross-section and could be disposed adjacent to the heating element 20, the annular heat reflector 26 configured to direct the heat from the heating element 20 toward the radome 12. The heating element 20 radiantly heats the radome 12 to ameliorate ice accumulation on the radome 12. Additionally, the fan 22 could be proximal to the heating element 20 and configured to cause movement of the heat relative to the radome 12. Alternatively, the fan 22 is omitted.

The feed structure 18 can have differing shapes and sizes. In some instances, the feed structure 18 is a cylindrical tube extending annularly about the transmission line 4 and defining a space between the feed structure 18 and the transmission line 4, the space containing the heating element 20. The feed structure 18 may define apertures at a first end of the feed structure 18, the apertures at the first end of the feed structure 18 comprising air inlet apertures 14. The feed structure 18 may define apertures at a second end of the feed structure 18 opposite the first end. The apertures at the second end of the feed structure 18 may be air outlet apertures 16. The antenna 1 can also have the fan 22 inside the feed structure 18 that is configured to pass air over the heating element 20 to warm the air and circulate the warmed air within a space defined between the reflector 2 and the radome 12.

In some instances, the heating element 20 operates continuously. In other instances, the controller 3 is connected to the heating element 20 to selectably activate and deactivate the heating element 20 to maintain a temperature of the radome 12 at a threshold temperature above freezing.

The components can also be arranged as a warming system 7 that is installed on a dish antenna. For instance, a warming system 7 for a dish antenna may include the feed structure 18, the electrical heating element 20 of the heater assembly 10, and the controller 3. The feed structure 18 has at least one open end to receive the transmission line 4 (e.g., an RF waveguide) of the dish antenna and is configured for installation about the transmission line 4 of the dish antenna 1. The electrical heating element 20 is attached to, or within, the feed structure 18. The controller 3 is connected to the electrical heating element 20 and is configured to activate the electrical heating element 20 to warm at least a portion of the dish antenna 1 to ameliorate ice accumulation on the dish antenna 1. The feed structure 18 may be cylindrical and concentric about at least a portion of the transmission line 4.

Various configurations of the electrical heating element 20 are possible. In some instances, the electrical heating element 20 is disposed on an external surface of the feed structure 18 and is configured to radiantly heat the radome 12 of the dish antenna 1 that at least partially encloses the feed structure 18 between the radome 12 and a reflector 2 of the dish antenna 1. In some instances, the electrical heating element 20 is disposed on an internal surface of the feed structure 18 and is configured to heat air inside the feed structure 18 for circulation through the feed structure 18 and into a space at least partially defined between the radome 12 of the dish antenna 1 and the reflector 2 of the dish antenna 1. In some instances, the electrical heating element 20 is disposed inside the feed structure 18 and connected to an inner surface of the feed structure 18, the system further comprising the fan 22 also disposed inside the feed structure 18 and configured to force air over the electrical heating element 20 for heating. In some instances, the electrical heating element 20 is disposed at an end of the feed structure 18 adjacent to the feed horn 6 of the dish antenna 1 that is connected to an end of the transmission line 4 (e.g., RF waveguide). In various embodiments, the feed structure 18 is installed concentrically about the transmission line 4, the transmission line 4 disposed between the reflector 2 and the radome 12 of the dish antenna 1, the radome 12 at least partially covering the reflector 2, wherein the electrical heating element 20 radiantly heats the radome 12 to ameliorate ice accumulation on the radome 12 of the dish antenna 1.

Figure 9:
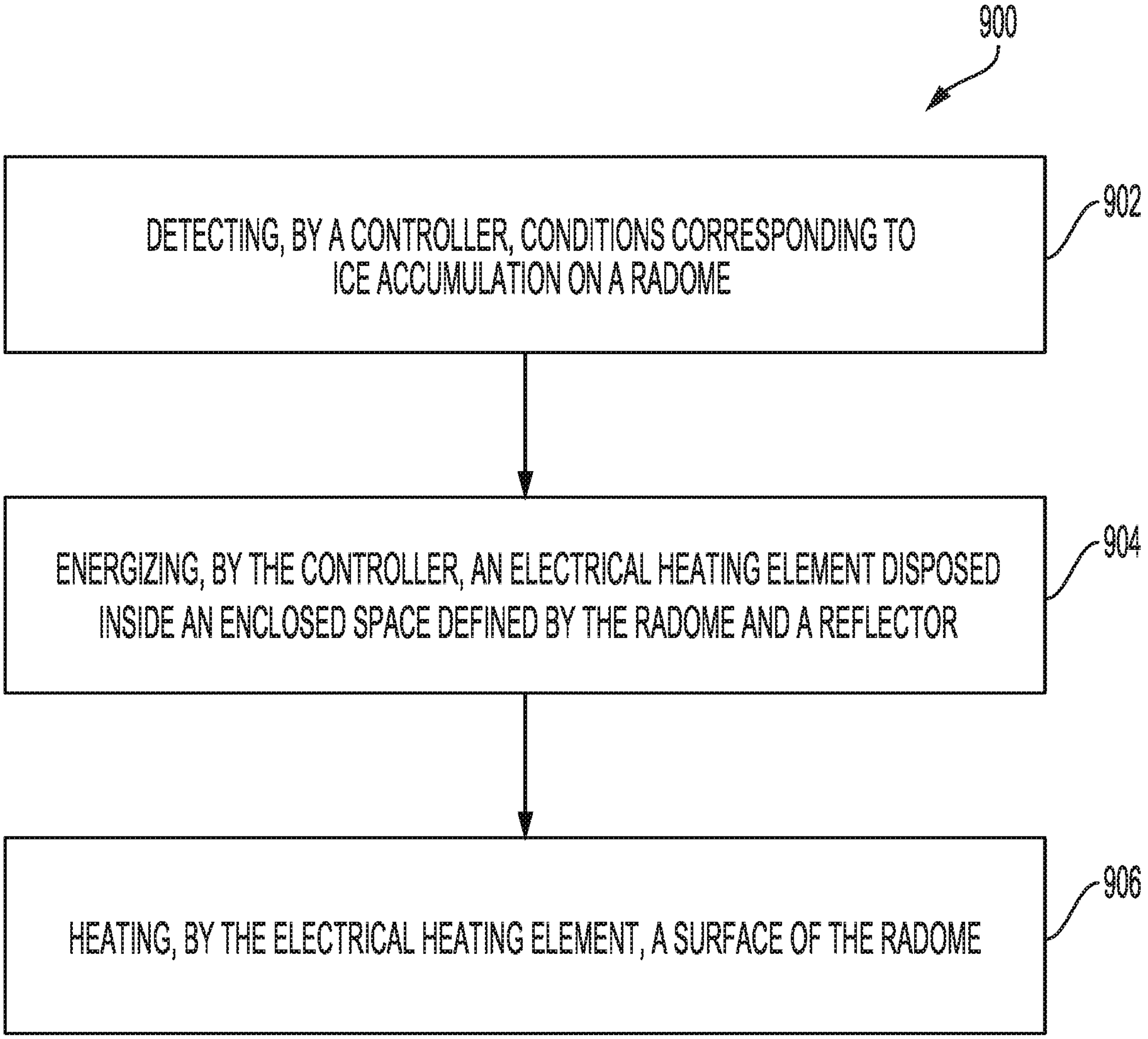
FIG. 9 illustrates a block diagram of a method of ameliorating ice accumulation on an antenna, in accordance with various embodiments.

In addition to the different embodiments of the system, a method of ameliorating ice accumulation on an antenna is provided. With reference to FIG. 9, a method 900 of ameliorating ice accumulation on an antenna may include various aspects. The antenna may have (i) a transmission line with a feed horn, (ii) a reflector spaced away from the feed horn, and (iii) and a radome at least partially enclosing at least a portion of the transmission line inside an enclosed space defined by the radome between the radome and the reflector. The method may include detecting, by a controller, conditions corresponding to ice accumulation on the radome (block 902). The method may include energizing, by the controller, an electrical heating element adjacent to the transmission line and disposed inside the enclosed space defined by the radome and the reflector (block 904). The energizing may be in response to the detecting. In further instances, block 902 is omitted and the controller energizes the electrical heating element continuously, or in response to a user input, operation of a switch, at various intervals, or the like. The method may include heating, by the electrical heating element, the radome of the antenna to ameliorate ice accumulation on the radome or on other components of the antenna (block 906). In various embodiments, the heating is of an inner surface of the radome or other components of the antenna to ameliorate ice accumulation on an outer surface of the radome or on the other components of the antenna. The heating may be radiant heating. For instance, the heating may be an emitting of infrared radiation to warm the radome. The heating may be convective heating. For instance, the heating may be a warming of air and circulating of the warmed air proximate to the radome. In further instances, the heating may be a combination of radiant and convective heating.

Block 902 discusses detecting conditions by a controller. In various embodiments, these conditions may be different environmental characteristics. These conditions may correspond to ice accumulation. For instance, conditions corresponding to ice accumulation may include a sensed condensation, a sensed precipitation, a sensed temperature, a sensed humidity, a sensed dew point, a sensed rate of change of temperature, a sensed rate of change of dew point, a sensed rate of change of humidity, or the like. Such conditions may include sensed moisture accumulation inside or outside of the radome. The controller may implement a variety of sensors to perform the detecting. Sensors may include optical, ultrasonic, capacitive, or other sensors. Moisture sensors may include etched coils that detect when moisture bridges neighboring coils and changes an electrical characteristic thereof.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An antenna comprising:

a transmission line configured to guide electromagnetic energy;

a feed horn connected to the transmission line and configured to convey the electromagnetic energy between the transmission line and a reflector;

the reflector spaced apart from the feed horn;

a radome comprising a cover extending from adjacent the reflector and covering at least a portion of at least one of the reflector, the transmission line, and the feed horn;

a feed structure at least partially surrounding the transmission line; and a heating element proximal to the feed structure and configured to provide heat to the radome and the reflector, wherein the heating element is disposed internal to the feed structure.

2. The antenna of claim 1, wherein the heating element is disposed on the feed structure.

3. The antenna of claim 1, wherein the transmission line is a wave guide.

4. The antenna of claim 1, further comprising a fan proximal to the heating element and configured to cause movement of the heat relative to the radome.

5. The antenna of claim 1, wherein the feed structure is a cylindrical tube extending annularly about the transmission line and defining a space between the feed structure and the transmission line, the space containing the heating element.

6. The antenna of claim 5, the feed structure further comprising air inlet apertures and air outlet apertures, wherein the air inlet apertures are configured to allow air to enter the feed structure, wherein the heating element is configured to warm the air from the air inlet apertures, wherein air outlet apertures are configured to allow the warmed air to exit the feed structure and circulate the warmed air in a space between the reflector and the radome to ameliorate ice accumulation on the radome.

7. The antenna of claim 1, wherein the heating element is disposed on an inner surface of the feed structure between the feed structure and the transmission line.

8. The antenna of claim 7, the feed structure further comprising air inlet apertures and air outlet apertures, wherein the air inlet apertures are configured to allow air to enter the feed structure, wherein the heating element is configured to warm the air from the air inlet apertures, wherein air outlet apertures are configured to allow the warmed air to exit the feed structure and circulate the warmed air in a space between the reflector and the radome to ameliorate ice accumulation on the radome.

9. The antenna of claim 1, wherein the cover of the radome extends across the entire face of the reflector covering the reflector, the transmission line, and the feed horn.

10. The antenna of claim 1, wherein the cover of the radome extends across the entire face of the reflector covering the reflector, the transmission line, and the feed horn, and wherein the heating element is configured to warm air and circulate the warmed air in a space between the reflector and the radome to ameliorate ice accumulation on the radome.

11. The antenna of claim 1, wherein the feed structure defines apertures at a first end of the feed structure, the apertures at the first end of the feed structure comprising air inlet apertures, wherein the feed structure defines apertures at a second end of the feed structure opposite the first end, the apertures at the second end of the feed structure comprising air outlet apertures, and wherein the antenna further comprises a fan inside the feed structure that is configured to pass air over the heating element to warm the air and circulate the warmed air within a space defined between the reflector and the radome.

12. The antenna of claim 11, wherein the heating element is disposed inside a heating element support tube that guides an airflow over the heating element.

13. The antenna of claim 1, wherein the feed structure defines apertures at a first end of the feed structure, the apertures at the first end of the feed structure comprising air inlet apertures, wherein the feed structure defines apertures at a second end of the feed structure opposite the first end, the apertures at the second end of the feed structure comprising air outlet apertures, wherein the air inlet apertures receive air from a space defined between the radome and the reflector to pass over and be warmed by the heating element, and wherein the air outlet apertures permit warmed air to exit the feed structure and circulate within the space defined between the radome and the reflector to warm the radome.

14. The antenna of claim 1, further comprising a controller connected to the heating element to selectably activate and deactivate the heating element to maintain a temperature of the radome at a threshold temperature above freezing.

15. The antenna of claim 1, wherein the antenna is a ground station antenna.

16. A method of ameliorating ice accumulation on an antenna having (i) a waveguide with a feed horn, (ii) a reflector spaced away from the feed horn, and (iii) a radome at least partially enclosing at least a portion of the waveguide inside an enclosed space defined by the radome between the radome and the reflector, the method comprising:

energizing, by a controller, an electrical heating element adjacent to the waveguide and disposed inside the enclosed space defined by the radome and the reflector; and radiantly heating, by the electrical heating element, an inner surface of the radome to ameliorate ice accumulation on an outer surface of the radome.

17. The method of claim 16, further comprising detecting, by the controller, conditions corresponding to ice accumulation on the radome, wherein the energizing is in response to the detecting.

18. An antenna comprising:

a transmission line configured to guide electromagnetic energy;

a feed horn connected to the transmission line and configured to convey the electromagnetic energy between the transmission line and a reflector;

the reflector spaced apart from the feed horn;

a radome comprising a cover extending from adjacent the reflector and covering at least a portion of at least one of the reflector, the transmission line, and the feed horn;

a feed structure at least partially surrounding the transmission line, wherein the feed structure defines apertures at a first end of the feed structure, the apertures at the first end of the feed structure comprising air inlet apertures, and wherein the feed structure defines apertures at a second end of the feed structure opposite the first end, the apertures at the second end of the feed structure comprising air outlet apertures; and a heating element proximal to the feed structure, wherein the air inlet apertures receive air from a space defined between the radome and the reflector to pass over and be warmed by the heating element, and wherein the air outlet apertures permit warmed air to exit the feed structure and circulate within the space defined between the radome and the reflector to warm the radome and the reflector.

* * * * *